United States Patent
Maruyama

(10) Patent No.: US 9,302,417 B2
(45) Date of Patent: Apr. 5, 2016

(54) INJECTION MOLDING MACHINE FOR CONTINUING OPERATION IN EVENT OF POWER OUTAGE

(71) Applicant: FANUC Corporation, Yamanashi (JP)

(72) Inventor: Junpei Maruyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/546,507

(22) Filed: Nov. 18, 2014

(65) Prior Publication Data

US 2015/0147422 A1 May 28, 2015

(30) Foreign Application Priority Data

Nov. 25, 2013 (JP) ................................. 2013-243147

(51) Int. Cl.
*B29C 45/76* (2006.01)
*B29C 45/84* (2006.01)

(52) U.S. Cl.
CPC ............. *B29C 45/7666* (2013.01); *B29C 45/84* (2013.01); *B29C 2945/76033* (2013.01); *B29C 2945/76163* (2013.01); *B29C 2945/76214* (2013.01); *B29C 2945/76498* (2013.01); *B29C 2945/76521* (2013.01); *B29C 2945/76692* (2013.01)

(58) Field of Classification Search
CPC .... B29C 45/5008; B29C 45/66; B29C 33/36; B29C 45/7666
USPC .......................................... 425/145, 150, 162
See application file for complete search history.

(56) References Cited

U.S. PATENT DOCUMENTS

| 4,678,980 | A | 7/1987 | Sugimoto et al. |
| 6,206,683 | B1 * | 3/2001 | Takahashi ............... B29C 45/64 425/589 |
| 6,629,011 | B1 * | 9/2003 | Calderon ............ B29C 67/0055 425/375 |
| 2003/0102588 | A1 * | 6/2003 | Tadros ...................... B29B 9/06 264/141 |
| 2011/0260373 | A1 * | 10/2011 | Finger ..................... B29C 49/12 425/150 |

FOREIGN PATENT DOCUMENTS

| EP | 2587660 A1 | 5/2013 |
| JP | 62-107698 A | 5/1987 |
| JP | 9-247990 A | 9/1997 |
| JP | 2004-216829 A | 8/2004 |
| WO | 2011/162246 A1 | 12/2011 |

OTHER PUBLICATIONS

Office Action mailed Mar. 3, 2015, corresponding to Japanese patent application No. 2013-243147.

* cited by examiner

*Primary Examiner* — Tim Heitbrink
(74) *Attorney, Agent, or Firm* — Hauptman Ham, LLP

(57) ABSTRACT

In an injection molding machine, a control instruction value change unit decreases a control instruction value for each axis when a power outage is detected by a power outage detection unit and returns the control instruction value for each axis to an original value when a power recovery is detected by the power outage detection unit.

6 Claims, 3 Drawing Sheets

INJECTION MOLDING MACHINE FOR CONTINUING OPERATION IN EVENT OF POWER OUTAGE

RELATED APPLICATIONS

The present application claims priority to Japanese Application Number 2013-243147, filed Nov. 25, 2013, the disclosure of which is hereby incorporated by reference herein in its entirety.

BACKGROUND OF THE INVENTION

1. Field of the Invention

The present invention relates to an injection molding machine, and particularly, to an injection molding machine for continuing operation in the event of a power outage.

2. Description of the Related Art

In an injection molding machine that drives an axis by a servo-motor, there is a need to continuously supply a power to a driving device of the servo-motor in order to drive the axis. For that reason, when a sudden power outage occurs and a power supply voltage becomes smaller than a voltage necessary for driving the servo-motor, the driving device of the servo-motor is stopped, and hence a problem arises in that a molding operation is stopped.

First, if the driving device of the servo-motor is stopped, a problem arises in that it takes a time until the molding operation is started again. Also, there is a problem in that a molding product, which is manufactured until the molding operation is stabilized after the molding operation is resumed, needs to be discarded as a defective product.

JP-A 2004-216829 discloses a technique of extending a voltage output maintaining time in the event of a sudden power outage by installing an energy maintaining circuit configured as an electric energy storage device in an electric circuit that supplies a control DC voltage to a driving device for driving a motor of a molding machine.

However, the technique disclosed in JP-A 2004-216829 has a concern that the cost of the molding machine may increase in that the molding machine additionally needs a device such as a converter circuit supplying a control DC power supply voltage to a plurality of drivers, a converter circuit supplying a control DC voltage to a molding machine control device, or an electric energy storage device.

SUMMARY OF THE INVENTION

Therefore, the invention is made to solve the above-described problems of the related art, and an object of the invention is to provide an injection molding machine capable of preventing a molding operation from being stopped due to a decrease in control voltage even in the event of a power outage without requiring a particular device such as an electric energy storage device.

According to the invention, there is provided a control device for an injection molding machine for continuing operation in the event of a power outage and driving an axis by a servo-motor, including: a driving device configured to drive the servo-motor; a power outage detection unit configured to detect a power outage of a power supply supplying a power to the driving device; a molding operation control unit configured to control a molding operation; and a control instruction value change unit configured to, instruct a change of a control instruction value, output from the molding operation control unit to the driving device for each axis, to the molding operation control unit, and output an instruction of decreasing the control instruction value for each axis when the power outage detection unit detects a power outage and outputs an instruction of returning the control instruction value for each axis to an original value to the molding operation control unit when the power outage detection unit detects a power recovery.

The control instruction value change unit may decrease a pressure instruction value for an axis subjected to a pressure control and may decrease a speed instruction value for an axis other than the axis subjected to the pressure control, when the power outage detection unit detects a power outage.

The molding operation control unit may stop the molding operation when the power outage detection unit detects the power outage during an injection, and may continue the molding operation after the control instruction value change unit returns the control instruction value to an original value when the power outage detection unit detects the power outage at the time other than during the injection.

The power outage detection unit may determine the power outage based on that any one phase of a voltage amplitude among the phases of voltage amplitudes used in the power outage detection and supplied from an AC power supply to the driving device becomes smaller than a power outage detection voltage amplitude, and may determine a power recovery from the power outage based on that all phases of voltage amplitudes become a power recovery detection voltage amplitude or more.

The power outage detection unit may determine the power outage based on that a control voltage of any one driving device among control voltages of the driving devices becomes smaller than a power outage detection control voltage, and may determine a power recovery from the power outage based on that the control voltages of all driving devices become a power recovery detection control voltage or more.

Since the invention has the above-described configuration, it is possible to provide an injection molding machine capable of preventing a molding operation from being stopped due to a decrease in control voltage by decreasing the power consumption of a servo-motor so that a control voltage of a driving device for driving the servo-motor is maintained even in the event of a power outage.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
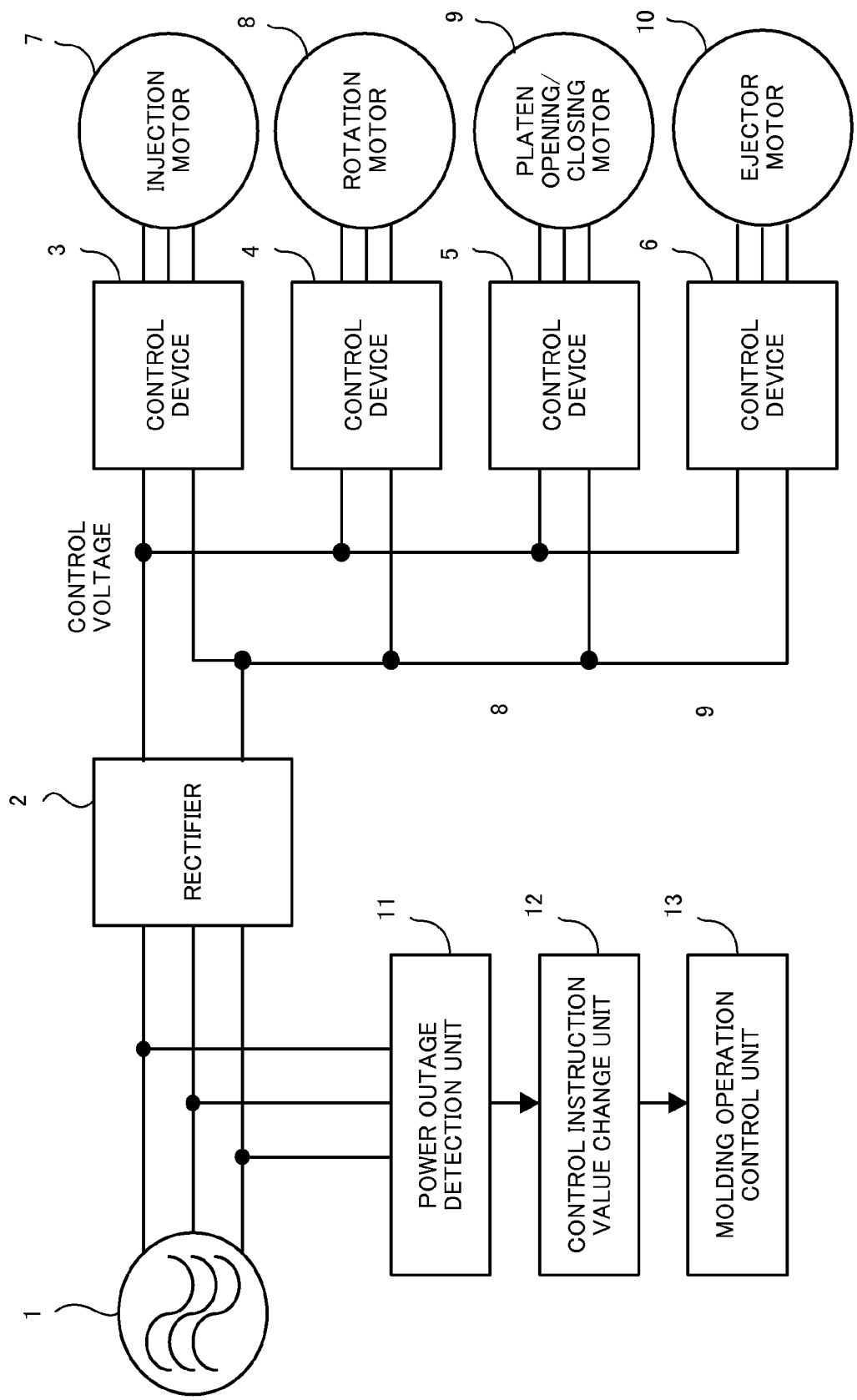
FIG. 1 is a diagram illustrating an embodiment in which a power outage is determined based on a voltage supplied from an AC power supply to a driving device.
Figure 2:
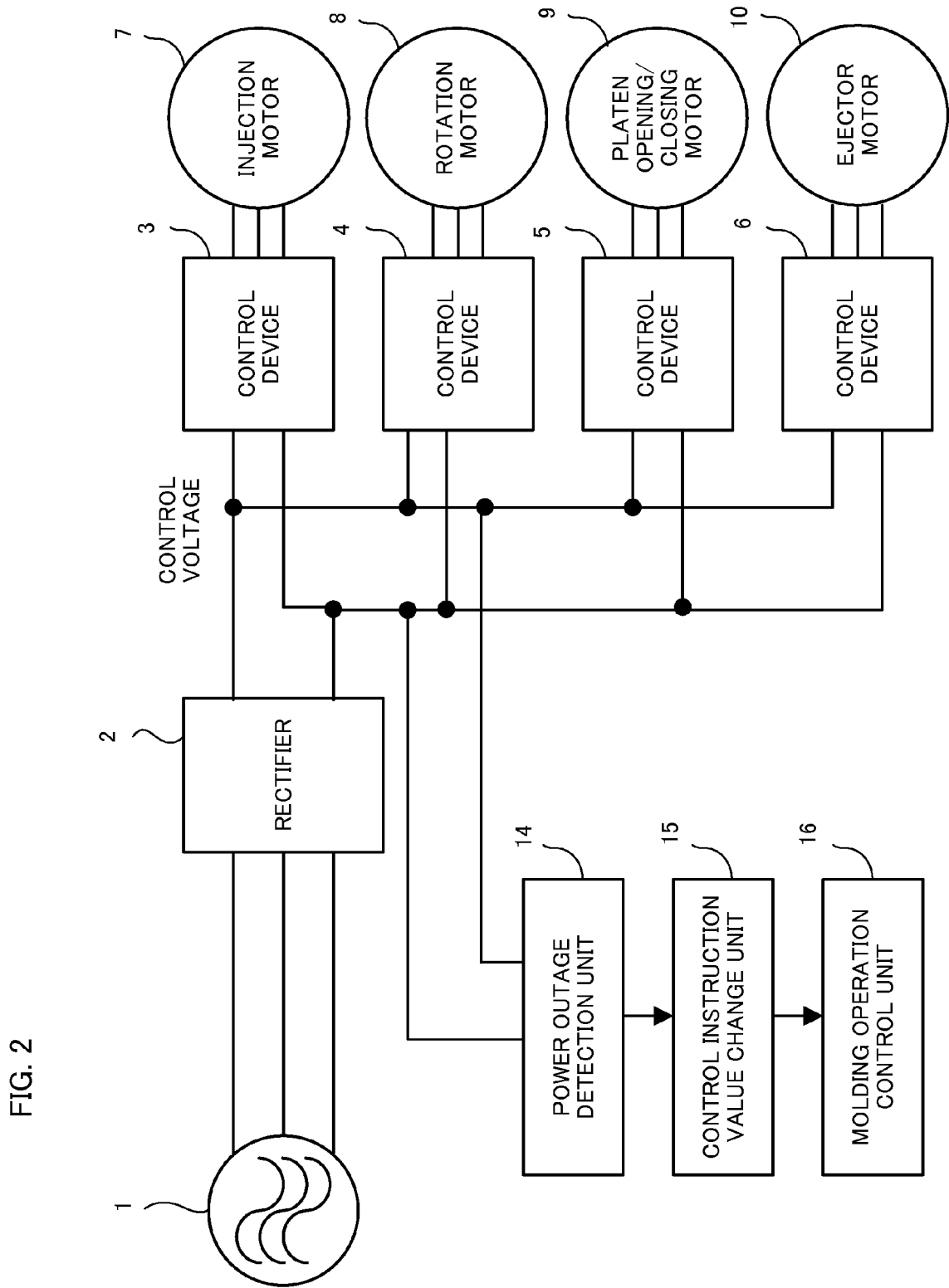
FIG. 2 is a diagram illustrating an embodiment in which a power outage is determined based on a control voltage of a driving device.

FIGS. 1 and 2 are functional block diagrams illustrating a main part of an injection molding machine. A driving device of a servo-motor generally includes a smoothing capacitor in an electric circuit of the driving device, and maintains a certain degree of electric energy. For that reason, there is a possibility that a control voltage of the driving device may be maintained if a power outage time is short even in the event of a power outage. However, if the power consumption of the servo-motor is large in the event of the power outage, the electric energy which is maintained by the capacitor is consumed in a short time, and hence the driving device of the servo-motor is stopped. Therefore, some embodiments of the invention are characterized in that a power outage detection unit that detects the power outage is provided and a control instruction value is changed so that the power consumption of the servo-motor is decreased during the power outage detection.

FIG. 1 is a diagram illustrating an embodiment in which a power outage is determined based on a voltage supplied from an AC power supply to a driving device. FIG. 1 illustrates an injection molding machine including an injection motor 7, a rotation motor (a measuring motor) 8, a platen opening/closing motor 9, and an ejector motor 10 as drive motors. These motors are respectively controlled by driving devices 3, 4, 5, and 6, and drive respective movable portions of an injection molding machine body. A control DC voltage supplied to the driving devices 3, 4, 5, and 6 is generated by rectifying a voltage of a commercial AC power supply 1 using a rectifier 2. The rectifier 2 or each of the driving devices 3, 4, 5, and 6 includes a smoothing capacitor, and hence may temporarily store the regenerative energy from the motor. The power outage detection unit 11, the control instruction value change unit 12, and the molding operation control unit 13 will be described below.

FIG. 2 is a diagram illustrating an embodiment in which a power outage is determined based on the control voltage of the driving device. The AC power supply 1, the rectifier 2, the driving devices 3, 4, 5, and 6, the injection motor 7, the rotation motor (the measuring motor) 8, the platen opening/closing motor 9, and the ejector motor 10 have the same configuration as FIG. 1. A power outage detection unit 14, a control instruction value change unit 15, and a molding operation control unit 16 will be described below.

Hereinafter, the power outage detection units 11 and 14, the control instruction value change unit 12 or 15, and the molding operation control unit 13 or 16 will be described.

<Power Outage Detection Unit>

As illustrated in FIG. 1, the power outage detection unit 11 may be configured to monitor the amplitude of the voltage supplied from the AC power supply 1 to the rectifier 2. In this case, a configuration may be employed in which, at least one phase of the voltage amplitudes of the AC power supply 1 is monitored, and the power outage is detected when any one phase of the voltage amplitudes among the detected voltage amplitudes becomes smaller than a power outage detection voltage amplitude.

Further, a configuration may be employed in which the power recovery from the power outage is detected when all phases of voltage amplitudes among the voltage amplitudes detected by the power outage detection unit 11 become a power recovery detection voltage amplitude or more. Here, the power recovery detection voltage amplitude is set to at least the power outage detection voltage amplitude or more.

Figure 3:
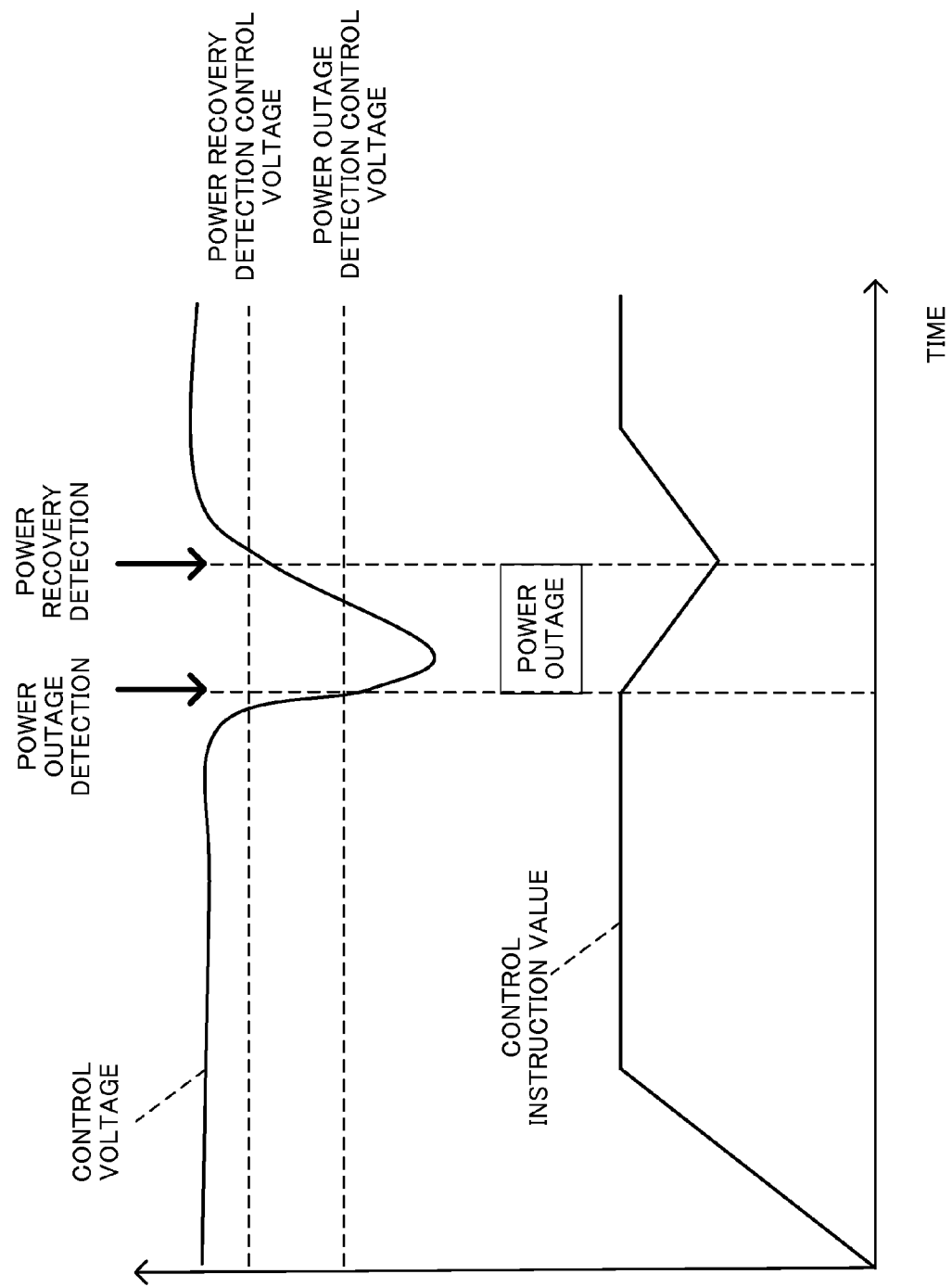
FIG. 3 is a diagram illustrating a change in control instruction value during power outage detection.

Further, as illustrated in FIG. 2, the power outage detection unit 14 may be configured to monitor the voltages of the control voltages of the driving devices 3, 4, 5, and 6 of the servo-motors (the injection motor 7, the rotation motor 8, the platen opening/closing motor 9, and the ejector motor 10) (see FIG. 3). In this case, a configuration may be employed in which, the control voltage of the driving device of at least one servo-motor is monitored, and the power outage is detected when at least one voltage of the detected control voltages becomes smaller than a power outage detection control voltage value.

Further, a configuration may be employed in which, the power recovery from the power outage is detected when all voltages among the control voltages detected by the power outage detection unit 14 become a power recovery detection control voltage value or more. Here, the power recovery detection control voltage value is set to at least the power outage detection control voltage value or more.

As illustrated in FIG. 3, the control voltage is detected in the power outage detection unit 14. The power outage is detected when the detected control voltage becomes smaller than the power outage detection control voltage, and the power recovery is detected when the detected control voltage becomes larger the power recovery detection control voltage. The power outage detection unit 14 outputs information on the power outage and the power recovery to the control instruction value change unit 15.

Further, there is a case in which the power outage and the power recovery are not easily and normally detected due to a change in voltage value caused by noise or the like when the power outage and the power recovery are detected based on the voltage value as described above. In such a case, the power outage and the power recovery may be detected based on a voltage value obtained by removing noise from the voltage value through a filter or an integration value of the voltage value in time.

<Control Instruction Value Change Unit>

When the power outage detection unit 11 (FIG. 1) or 14 (FIG. 2) detects the power outage, the control instruction value change unit 12 (FIG. 1) or 15 (FIG. 2) outputs an instruction of changing the control instruction value so as to decrease the power consumption of the servo-motors, that is, the injection motor 7, the rotation motor 8, the platen opening/closing motor 9, and the ejector motor 10 to the molding operation control unit 13 or 16. For example, a configuration may be employed in which a speed instruction value or a torque instruction value is decreased so as to decrease the power consumption of the servo-motor, if the drive axis of the servo-motor moves when the power outage detection unit 11 or 14 detects the power outage. Further, a configuration may be employed in which a pressure instruction value is decreased so as to decrease the power consumption of the servo-motor if the servo-motor, that is, the injection motor 7 is subjected to a pressure control when the power outage detection unit 11 or 14 detects the power outage. At this time, the molding operation is continued although there is a case in which the operation of the servo-motor is stopped due to a change in control instruction value.

Then, when the power outage detection unit 11 or 14 detects the power recovery, the control instruction value change unit 12 or 15 continues the molding operation by returning the decreased control instruction value to the original instruction value. Further, at this time, the molding operation selection case or the molding operation stop case may be selected in response to the molding process when the power outage detection unit 11 or 14 detects the power outage.

For example, since a resin is completely charged into a platen by an injection screw in the event of the power outage during a platen opening/closing step, an ejecting step, a cooling step, or the like, the influence on the molding product is small even when the axis is stopped during the power outage detection. Further, since a resin is almost completely charged into a platen by an injection screw even in the event of the power outage during a pressure maintaining step or a measuring step, the influence on the molding product is small even when the axis is stopped during the power outage detection.

Meanwhile, if the injection screw is stopped while a resin is charged into a platen by an injection screw in the event of the power outage during the injection step, a resin is solidified inside the platen during the charging operation. Accordingly, there is a concern that the operation of charging a resin into the platen may not be normally performed even when the injection screw is continuously operated after the power outage is solved. For that reason, if the power outage is detected during the injection step, the molding operation is not continued, but is stopped even when the power recovery is detected. Meanwhile, if the power outage is detected during the other steps, the molding operation may be continued when the power recovery is detected.

However, if the power outage time is short even in the event of the power outage during the injection step, there is a case in which the influence on the molding product is small. Therefore, if the power outage is detected during the injection step and the power outage time is a predetermined time or less, the molding operation may be continued when the power recovery is detected.

Furthermore, the control instruction value which is decreased when the power outage is detected may be determined in advance based on a power consumption value for each axis or may be decreased to zero.

Further, in the case of a control of selecting the next step by counting an elapse time in the pressure maintaining step or the like, an operation of counting a pressure maintaining time may be temporarily stopped while the control instruction value is decreased by the detection of the power outage and the counting operation may be resumed based on the control instruction value by the detection of the power recovery. However, when there is no influence on the effectiveness of the step even when the control instruction value is decreased by the detection of the power outage in the cooling step or the like, an operation of counting a cooling time or the like may be continued without any stop. When the control instruction value change unit changes the control instruction value due to the power outage detected by the power outage detection unit, the molding product in the cycle may be determined as a defective product.

<Molding Operation Control Unit>

The molding operation control unit 13 (FIG. 1) or 16 (FIG. 2) controls the execution of the molding cycle by controlling the entire injection molding machine. During the execution of the molding cycle, the molding operation control unit 13 or 16 outputs the control instruction value to each of the driving devices 3, 4, 5, and 6 respectively driving the injection motor 7, the rotation motor 8, the platen opening/closing motor 9, and the ejector motor 10. Furthermore, in FIGS. 1 and 2, the output of the control instruction value from the molding operation control unit 13 or 16 to each of the driving devices 3, 4, 5, and 6 and the supply of the power to the molding operation control unit 13 or 16 are not depicted. The molding operation control unit 13 or 16 performs a control of decreasing the control instruction value for each motor to a value smaller than the normal instruction value or returning the decreased control instruction value to the normal instruction value based on the instruction from the control instruction value change unit 12 or 15. Furthermore, when the molding operation control unit 13 or 16 determines whether the molding product is a good product or a defective product, the power outage detection unit detects the power outage, and the control instruction value change unit changes the control instruction value, the molding product in the cycle may be determined as a defective product.

The invention claimed is:

1. A control device for an injection molding machine for continuing operation in the event of a power outage and driving an axis by a servo-motor, comprising:
   a driving device configured to drive the servo-motor;
   a power outage detection unit configured to detect a power outage of a power supply to the driving device;
   a molding operation control unit configured to control a molding operation;
   a control instruction value change unit configured to, instruct a change of a control instruction value output from the molding operation control unit to the driving device for each axis to the molding operation control unit, and,
   output an instruction of decreasing the control instruction value for each axis when the power outage detection unit detects a power outage and output an instruction of returning the control instruction value for each axis to an original value to the molding operation control unit when the power outage detection unit detects a power recovery.

2. The control device for an injection molding machine for continuing operation in the event of a power outage according to claim 1,
   wherein the control instruction value change unit is configured to decrease a pressure instruction value for an axis subjected to a pressure control and decrease a speed instruction value for an axis other than the axis subjected to the pressure control, when the power outage detection unit detects a power outage.

3. The control device for an injection molding machine for continuing operation in the event of a power outage according to claim 1,
   wherein the molding operation control unit is configured to stop the molding operation when the power outage detection unit detects the power outage during an injection, and is configured to continue the molding operation after the control instruction value change unit returns the control instruction value to an original value when the power outage detection unit detects the power outage at the time other than during the injection.

4. The control device for an injection molding machine for continuing operation in the event of a power outage according to claim 2,
   wherein the molding operation control unit is configured to stop the molding operation when the power outage detection unit detects the power outage during an injection, and is configured to continue the molding operation after the control instruction value change unit returns the control instruction value to an original value when the power outage detection unit detects the power outage at the time other during than the injection.

5. The control device for an injection molding machine for continuing operation in the event of a power outage according to claim 1,
   wherein the power outage detection unit is configured to determine the power outage based on that any one phase of a voltage amplitude among the phases of voltage amplitudes used in the power outage detection and supplied from an AC power supply to the driving device becomes smaller than a power outage detection voltage amplitude, and is configured to detect a power recovery from the power outage based on that all phases of voltage amplitudes become a power recovery detection voltage amplitude or more.

6. The control device for an injection molding machine for continuing operation in the event of a power outage according to claim 1, wherein the power outage detection unit is configured to determine the power outage based on that a control voltage of any one driving device among control voltages of the driving devices becomes smaller than a power outage detection control voltage, and is configured to determine a power recovery from the power outage based on that the control voltages of all driving devices become a power recovery detection control voltage or more.

* * * * *